Jan. 21, 1930.          C. W. MABEY                1,744,234
                        DISPLAY HEATER
                     Filed Jan. 14, 1929

INVENTOR,
Charles W. Mabey.
By Winturn & Winturn,
    Attorneys.

Patented Jan. 21, 1930

1,744,234

UNITED STATES PATENT OFFICE

CHARLES W. MABEY, OF INDIANAPOLIS, INDIANA, ASSIGNOR TO MABEY ELECTRIC AND MANUFACTURING COMPANY, OF INDIANAPOLIS, INDIANA

DISPLAY HEATER

Application filed January 14, 1929. Serial No. 332,259.

This invention relates generally to heating devices and particularly to means for heating and maintaining Frankfurters at a desired temperature preliminary to their being inserted in sandwiches or buns as called for in quick lunch establishments and the like.

The invention provides a heating element below a pan of water above which is a rack of a reticulated or foraminated nature to support the Frankfurters in the vapor or steam arising from the heated water. The space above the water pan is divided into two compartments with an indicator so that when the heated Frankfurters are removed from one compartment, that compartment is filled with fresh ones to be heated and the indicator moved over to prevent free access to the fresh ones and to give access to the heated ones in the other compartment. Other objects of the invention reside in the neat compact form of the structure so assembled as to permit ready separation of all parts for cleaning, and in its low cost of production.

The invention is described in detail in the one particular form as shown by the accompanying drawing, in which—

Figure 1:
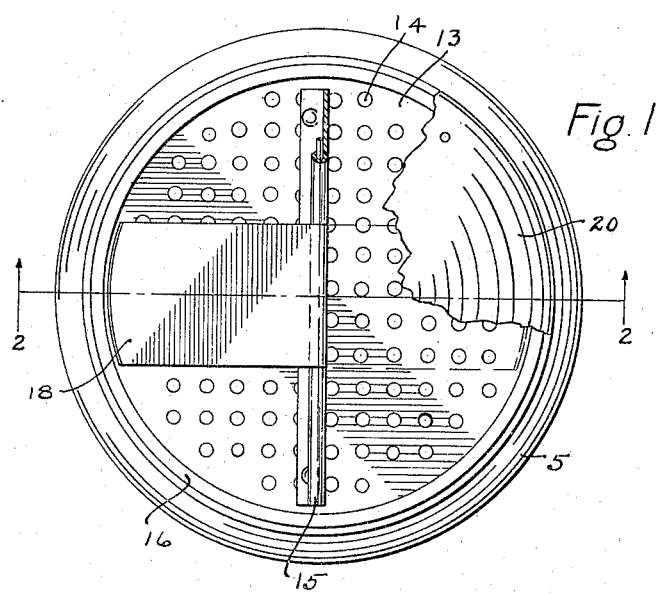

Fig. 1 is a fragmentary top plan view of the heater; and

Figure 2:
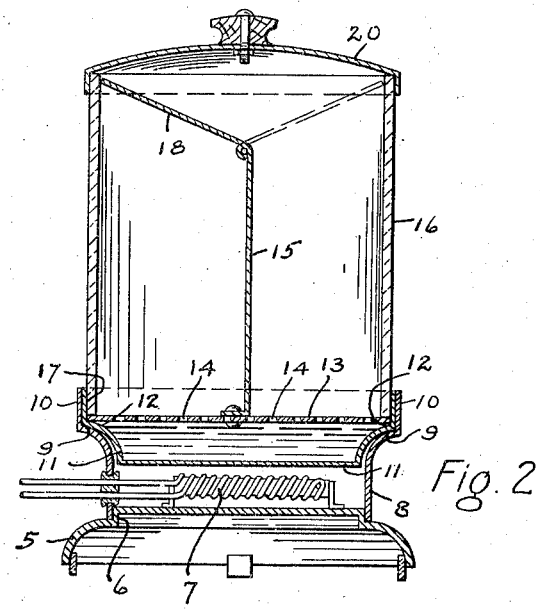

Fig. 2, a vertical section through the heater on the line 2—2 of Fig. 1.

Like characters of reference indicate like parts in the two views in the drawing.

I form a circular base 5 having a raised boss 6 projecting upwardly therefrom, on which boss I mount an electrical heating element 7. A short cylinder 8 is slipped over the boss 6 to frictionally engage therewith and to surround the heating element.

This cylinder 8 is flared out at its top to provide an annular shoulder 9 and a vertically extending flange 10 therearound.

A water pan 11 is shaped to fit snugly within the annular flange 10 and rest on the shoulder 9, with its under side immediately above the heating element 7. In forming the pan 11 to fit within the top of the cylinder 8, an annular shoulder 12 is produced within the pan on which is positioned the floor 13.

This floor 13 is here shown as a circular disk with the perforations 14, though it may be formed from wire cloth or netting. On a diameter of the floor 13, is positioned and secured an upwardly extending wall 15, and a glass cylinder 16, open at both its top and bottom ends rests on top of the floor 13 within the upturned flange 17 of the water pan 11. The wall or partition 15 terminates at its top end somewhat below the top of the glass cylinder 16, and has centrally hinged thereto, the indicator plate 18 which may be swung about the top end of the partition 15 to contact the cylinder 16 in an inclined position. A cover 20 is provided to fit loosely over the top end of the cylinder 16 and a vent hole not shown, may be formed through the cover.

In practice, the Frankfurters (not shown) are packed on end within the cylinder 16 on each side of the partition 15 so that the steam or vapor may pass upwardly from the water in the pan 11 through the floor 13, and up along between the Frankfurters and thereby heat them.

The indicator 18 is turned over to rest above the Frankfurters on one side of the partition and the Frankfurters on the uncovered side are entirely withdrawn as required, whereupon that empty side is again refilled with cold Frankfurters, the indicator turned over the cold Frankfurters, and the heated Frankfurters are then used on the other side until exhausted, the procedure being repeated as the Frankfurters are dispensed.

I claim:

1. In a heater, a container, a removable floor at the bottom of the container, means for producing and carrying water vapor into said container, a partition in the container attached to the floor, and an indicator movable from one side of the partition to the other, said indicator comprising a plate hinged to the partition and relatively narrow to provide vapor circulating spaces past it.

2. In a heater, a water pan, a heating element under the pan, a perforate metal floor over the pan, a glass cylinder resting on the floor, a partition wall secured to the floor and extending into said cylinder, and an indicator plate carried on the wall adapted to be moved to either side of the wall toward the cylinder said plate being relatively narrow to provide free vapor circulating spaces past it, and a flanged cylinder supporting said pan and a base supporting said cylinder and heating element whereby said pan, floor, and container are removably supported in relation to each other.

In testimony whereof I affix my signature.

CHARLES W. MABEY.